US008660928B2

(12) United States Patent
Green

(10) Patent No.: US 8,660,928 B2
(45) Date of Patent: *Feb. 25, 2014

(54) SYSTEMS AND METHODS FOR CONTROLLING PORTFOLIOS

(76) Inventor: Zachary Miller Green, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/347,678

(22) Filed: Jan. 10, 2012

(65) Prior Publication Data

US 2012/0179628 A1 Jul. 12, 2012

Related U.S. Application Data

(63) Continuation of application No. 11/936,172, filed on Nov. 7, 2007, now Pat. No. 8,095,446.

(51) Int. Cl.
*G06Q 40/00* (2012.01)

(52) U.S. Cl.
USPC .............................. 705/36 R; 705/35; 705/37

(58) Field of Classification Search
USPC ....................................................... 705/36 R
See application file for complete search history.

(56) References Cited

U.S. PATENT DOCUMENTS

2005/0154662 A1* 7/2005 Langenwalter ................. 705/35

* cited by examiner

*Primary Examiner* — James A Vezeris
(74) *Attorney, Agent, or Firm* — Moazzam & Associates, LL

(57) ABSTRACT

Systems and methods are disclosed which relate to the management of asset invested in a fund. The system includes a computer connected to a network which has constantly updated fund data available to compare a current fund with a plurality of possible new funds. The system automatically transfers from one fund to another according to user predetermined criteria.

15 Claims, 7 Drawing Sheets

Criterion Selection — 600, 642

640 — IF | THEN — 642

IF:
- Total Asset Size of
- Money Market Fund 123
- As of the last 1 day
- falls less than
- 1,000,000,000 USD
- ☑ Send Notice THEN:
- Transfer Total Fund
- To another fund that having the
- Highest Net Fund Performance
- As of the last 30 days
- ☑ With Total asset size of
- At least
- 1,000,000,000 USD
- ☑ Send Confirmation

Fig. 6A

Criterion Selection — 600, 642

640 — IF | THEN — 642

IF:
- Gross Fund Perform. of
- Mutual Fund 350
- As of the last 30 days
- falls less than
- 5.25 %
- ☑ Send Notice THEN:
- Transfer Total Fund
- To another fund that having the
- Highest Gross Fund Perform.
- As of the last 30 days
- ☐ With Select
- Select
- USD
- ☑ Send Confirmation

Criterion Selection

640

| IF | THEN |
|---|---|
| S&P Rating ▼ of | Transfer Total Fund ▼ |
| Money Market Fund 613 ▼ | To another fund that having the |
| As of the last  1 day ▼ | Highest S&P Rating ▼ |
| falls less than ▼ | As of the last  20 days ▼ |
| Triple    A ▼ | ☑ With  Total asset size of ▼ |
|  | At least ▼ |
| ☑ Send Notice | 1,000,000,000  USD ▼ |
|  | ☑ Send Confirmation |

Criterion Selection

640

| IF | THEN |
|---|---|
| Net Fund Perform. ▼ of | Transfer Total Fund ▼ |
| Mutual Fund 027 ▼ | To another fund that having the |
| As of the last  15 days ▼ | Highest Net Fund Perform. ▼ |
| falls less than ▼ | As of the last  60 days ▼ |
| 5.0    % ▼ | ☑ With  S&P Rating of ▼ |
|  | At least ▼ |
| ☑ Send Notice | Triple    A ▼ |
|  | ☑ Send Confirmation |

Fig. 6D

SYSTEMS AND METHODS FOR CONTROLLING PORTFOLIOS

This application is a continuation of U.S. patent application Ser. No. 11/936,172, filed Nov. 7, 2007, now U.S. Pat. No. 8,095,446, the content of which is hereby incorporated by reference herein in its entirety into this disclosure.

BACKGROUND OF THE INVENTION

1. Field of the Invention

The present invention relates to controlling portfolios. More particularly, the present invention relates to automatically allocating, rebalancing and transferring funds between mutual funds and portfolios based upon predetermined criteria.

2. Background of the Invention

A mutual fund is a managed form of collective investments that pools money from many investors and invests it into portfolios composed primarily of stocks, bonds, short-term money market instruments, or other securities.

Most mutual funds' investment portfolios are continually adjusted under the supervision of a professional manager. This manager generally forecasts the future performance of investments appropriate for the fund and chooses those which he or she believes will most closely match the fund's stated investment objective. This is known as active management. However, other mutual funds mirror established indices such as the S&P 500 and Wilshire 5000. The manager simply invests to replicate the movements of the index, regardless of market conditions. This form of management is known as passive management because the manager usually relies on a computer model with little human input. There is much debate of which style of management yields the best results, with positive and negative attributes on either side.

Choosing the "best fit" mutual fund to invest in is complicated. The potential investor should be aware of the risks and performance of each fund, as well as the type of fund. Funds vary substantially in their holdings and goals. Some funds may take on more risk in anticipation of a higher payoff in the future. Other funds focus on a more conservative approach avoiding risk for a more secure and consistent return. Depending on the specific goals of an investor, all criteria should be scrutinized in order to match those goals with a particular fund. Mutual fund growth is often unpredictable. If a fund is invested heavily in one particular area, a sudden change in that market can significantly alter the status of the fund. It is for this reason that mutual fund managers typically diversify the holdings of a mutual fund. Diversification gives the benefit of stability, as a sudden change in one area of the market will not substantially affect the entire fund.

One of the important factors for determining in which fund to invest is fund performance. If a particular fund is not performing up to an investor's expectations, the investor should transfer his assets to a fund that will meet his expectations. In order to minimize the possible loss involved in staying with a fund that has begun to underperform, this transfer should be done as soon as possible. However, constant monitoring of a fund's performance is beyond the capabilities of the average investor.

What is needed is a system or method that can automatically reallocate and rebalance a portfolio based on the predetermined criteria given by the investor.

SUMMARY OF THE INVENTION

The present invention is a proprietary computer-based system which allows clients to have their account balances automatically "swept" or otherwise transferred from their current mutual fund (or position) to a new mutual fund (or position) that fits the client's predetermined criteria. Furthermore, the present invention features a user friendly selection screen in which to create criteria for use in selecting a new fund once a current fund no longer meets user criteria. This computer-based system can be in a remote location, on a network, or the user's personal computer. Once a transfer of assets is complete, a notification can be sent to the user.

In one exemplary embodiment, the present invention is a system for automatically allocating and rebalancing portfolios. The system includes an asset invested in a fund, a fund database having information about a plurality of funds, a computer connected to the fund database, and a user predetermined criteria including a condition that triggers a transfer of the asset from one fund to another on the computer. The computer automatically and without the need for any user intervention transfers the asset from a first fund to a second fund if the condition is satisfied.

In another exemplary embodiment, the present invention is a system for automatically allocating and rebalancing portfolios. The system includes a pre-selected fund, a user predetermined criteria prioritized by the user to determine which of a plurality of funds is suitable, a plurality of fund data which is continuously updated and used to determine which of the plurality of funds meets the user defined criteria, and a computer which continuously monitors the pre-selected fund to confirm it complies with the user defined criteria. An automatic transfer of funds is made in the event the fund fails to meet the user predetermined criteria.

In yet another exemplary embodiment, the present invention is a method for automatically allocating and rebalancing portfolios. The method includes programming a user predetermined criteria including a condition that triggers a transfer of an asset from a first fund to a second fund on a computer, and transferring the asset from the first fund to the second fund via the computer without any user intervention.

BRIEF DESCRIPTION OF THE DRAWINGS

FIG. 6A shows an example of a criterion selection screen according to an exemplary embodiment of the present invention.

FIG. 6B shows an example of a criterion selection screen according to an exemplary embodiment of the present invention.

FIG. 6C shows an example of a criterion selection screen according to an exemplary embodiment of the present invention.

FIG. 6D shows an example of a criterion selection screen according to an exemplary embodiment of the present invention.

DETAILED DESCRIPTION OF THE INVENTION

The present invention provides a novel solution to the problems associated with constant monitoring of a fund. In one exemplary embodiment, the present invention is a proprietary computer-based system which allows clients to have their account balances automatically "swept" or otherwise transferred from their current mutual fund (or position) to a new mutual fund (or position) that fits the client's predetermined criteria.

"Computer", as used herein and throughout this disclosure, refers to any device capable of running a software program and connecting to a network. Examples of computers include but are not limited to: desktop computers, laptop computers, Personal Digital Assistants (PDA's), mobile telephones, etc.

"Asset", as used herein and throughout this disclosure, refers to any economic value that is potentially or actually an investment. Examples of an asset include but are not limited to: cash, stock shares, mutual fund shares, money market shares, bank accounts, etc.

"Fund", as used herein and throughout this disclosure, refers to any collective investment. Examples of a fund include but are not limited to: a mutual fund, a money market fund, a stock index, a hedge fund, etc.

The data from mutual funds are fed into and aggregated into a proprietary application programming interface (API). The clients may then upload their own specific investment criteria parameters into this interface from whichever firm they do their online or institutional banking with. The invention allows for the automatic and seamless movement of client/institutional funds from one mutual fund to another based upon the user's pre-selected set of parameter(s).

Figure 1:
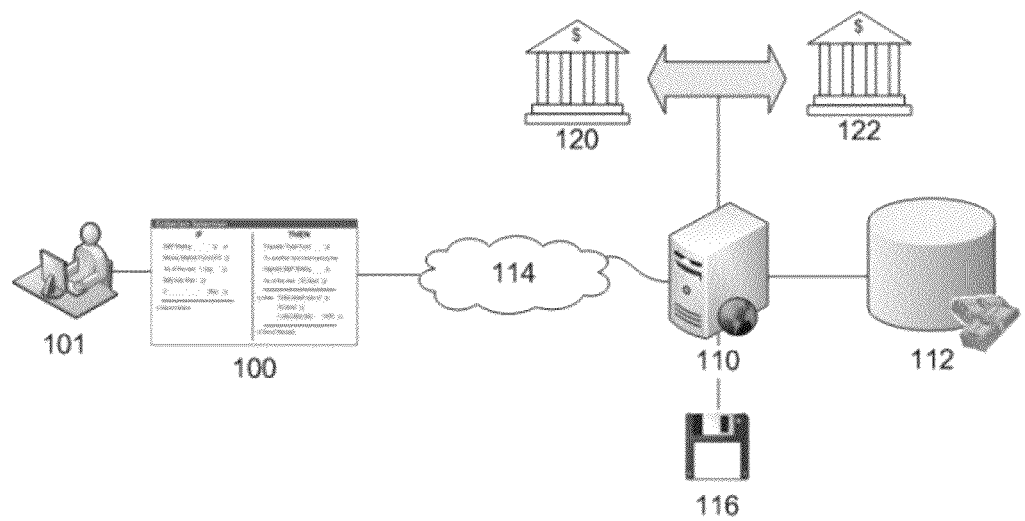
FIG. 1 shows a system for allocating and rebalancing portfolios according to an exemplary embodiment of the present invention.

FIG. 1 shows an exemplary embodiment of a system for automatically allocating and rebalancing portfolios according to an exemplary embodiment of the present invention. A selection screen 100 is an exemplary embodiment of a user interface where a user 101 sets parameter values and ranks the priority of the parameters. User 101 is connected through a network 114, such as the internet, to a server 110 which is in connection with a mutual fund database 112. Server 110 hosts an API 116 that gives clients a set of commands to use when setting parameters. Based on the set parameters, server 110 monitors the selected fund 120 of user 101. In the event that fund 120 fails to meet the criteria selected by user 101, server 110 automatically transfers the holdings from fund 120 to another fund 122 that matches the criteria entered by user 101 via server internet connection 110 without any user intervention.

For example, in one exemplary embodiment of the invention, a client selects to automatically have its portfolio cash swept to the highest yielding mutual fund available on the platform. This selection could be based upon the previous business day's closing net yield or any other pre-determined criteria. The transaction is accomplished seamlessly and automatically and without the need for a command, trade or even a keystroke on the part of the account holder.

Figure 2:
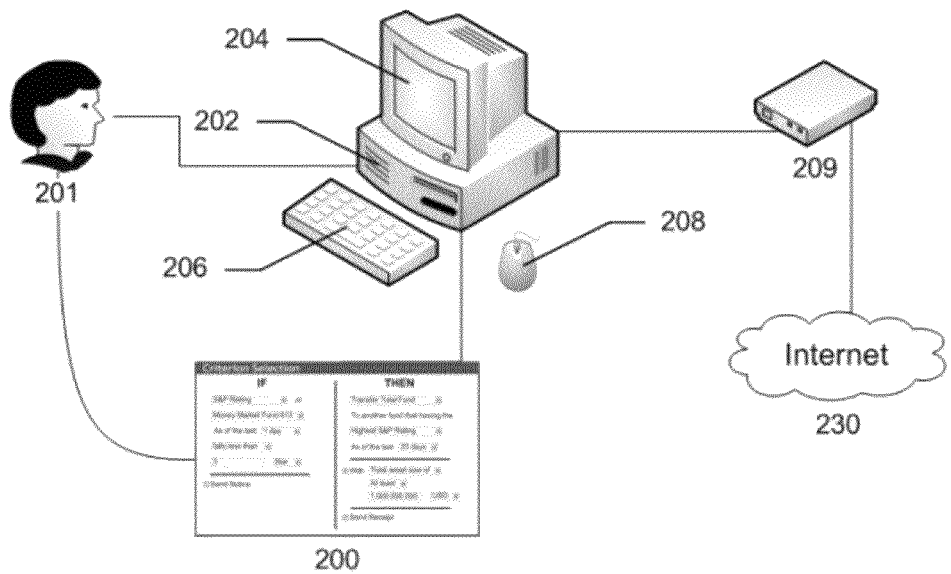
FIG. 2 shows a user interface and input devices according to an exemplary embodiment of the present invention.

FIG. 2 shows an exemplary embodiment of the user interface of the current invention. In this embodiment, a user 201 selects the investment parameters he desires on a personal computer by opening the selection screen 200 on his personal computer 202. This selection screen 200, which will be displayed on the screen 204, allows the user 201 to select from or enter the desired investment parameters. These parameters are entered into the computer 202 using the mouse 208, keyboard 206, or other input device, such as a stylus (not shown) or touchscreen (not shown). The computer 202 then communicates with the modem 209 which in turn communicates with the internet 230 to send the user's selected parameters to the server.

Figure 3:
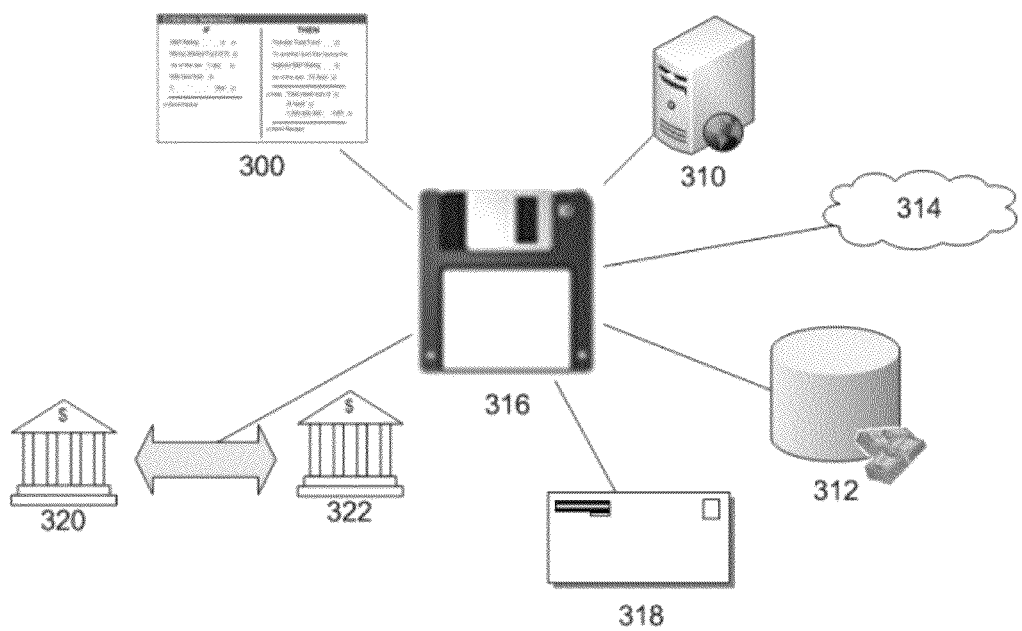
FIG. 3 shows a set of inputs and outputs of the application programming interface according to an exemplary embodiment of the present invention.

FIG. 3 shows an exemplary embodiment of the application programming interface 316 of the present invention. In this embodiment, a computer with the help of an application programming interface 316 gives clients a set of commands to use when setting investment parameters, such as reading individual fund data from the fund database 312, and transferring assets from one fund 320 to another fund 322. These commands are selected from the selection screen 300. Individual fund data can be current status or historical data including but not limited to: the asset size of the fund, the gross performance of the fund, the net fund performance, or other various rating criteria such as from S&P, Moody's or other NSRO. With this set of commands, users can program their criteria and preferences. Based on the selection criteria that the user programs and the data received from each of the funds, application programming interface 316 assigns server 310 to transfer funds to the appropriate mutual fund when necessary. A notification 318 may be sent to the fund manager as well as the user. This notification 318 could be in the form of an e-mail, text message, etc.

Figure 4:
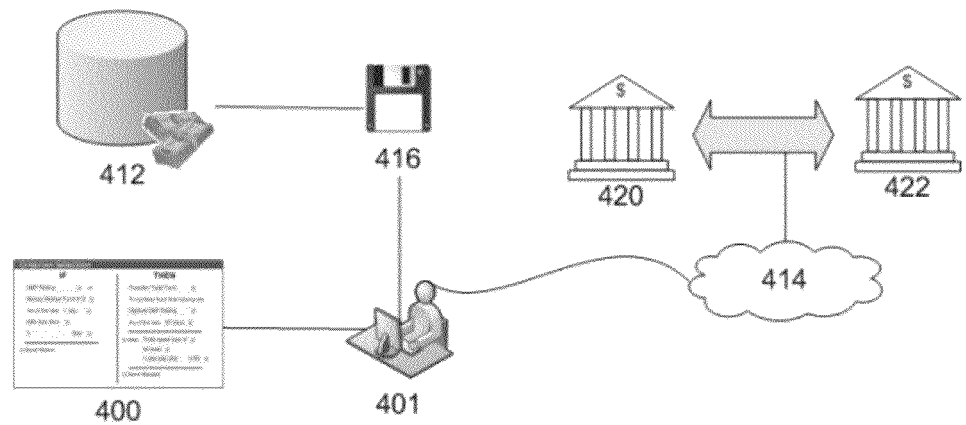
FIG. 4 shows a system for allocating and rebalancing portfolios according to an exemplary embodiment of the present invention.

FIG. 4 shows an exemplary embodiment of a system for automatically allocating and rebalancing portfolios. In this embodiment, a selection screen 400 is utilized as a graphical user interface for a computer program. A user 401 sets "If/Then" statements forming fund selection criteria. User 401 has access to a mutual fund database 412 through an API 416. The API 416 gives clients a set of commands to use when setting parameters for their investments. In this embodiment, API 416 resides on user 401's personal computer. User 401 is connected through a network 414, such as the internet. Based on the set criteria, the selected fund 420 of user 401 is monitored over the network connection 414. In the event that fund 420 fails to meet the criteria selected by user 401, network connection 414 is used to automatically transfer the assets from fund 420 to another fund 422 that matches the criteria entered by user 401.

Figure 5:
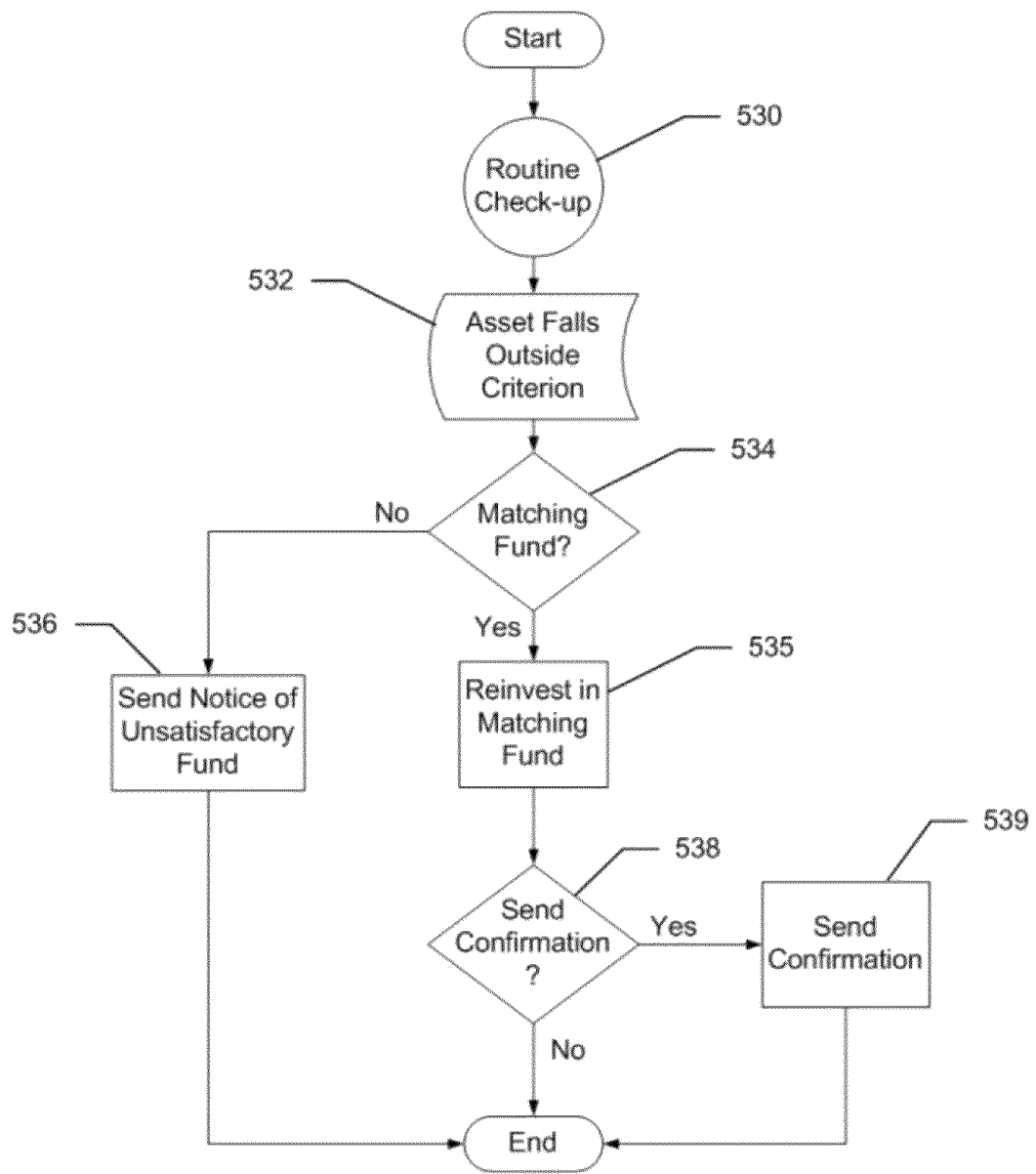
FIG. 5 shows a method of allocating funds according to an exemplary embodiment of the present invention.

FIG. 5 shows an exemplary embodiment of a method of allocating funds according to the present invention. In this embodiment, the invention determines an appropriate fund for investment based on predetermined criteria. The system first performs a routine check-up 530. This allows the system to determine whether any of the assets fall outside the set criteria 532. If the current assets are not within the set criteria, the system will determine whether or not there is another suitable fund that matches the criterion 534. If there is no such suitable fund, the system will send a notice that there in no such suitable fund 536 and then end. If there is a suitable fund, the assets will be reinvested in a fund matching the set criteria 535. With the funds reinvested, a confirmation will be sent 539 to the user, if the user has pre-selected this operation. If the user has not selected to receive a confirmation, nothing will be sent.

In one exemplary embodiment of the present invention, the system allows for predetermined "If/Then" criteria to determine which transactions will be made. These criteria can include, but are not limited to, the asset size of the fund, the gross performance of the fund, the net fund performance, or other various rating criteria, such as NAIC approval, Nynex/Comex, CME. The gross performance could be based on 1 day, 7 day, 30 day, 6 month, 12 month (annual), 3 year, 5 year, or 10 year averages. Net fund performance could be based on 1 day, 7 day, 30 day, 6 month, 12 month (annual), 3 year, 5 year, or 10 year averages. The other rating criteria could include various ratings criteria from NSRO's (Nationally Recognized Ratings Organizations such as Standard and Poors).

FIGS. 6A, 6B, 6C, and 6D show exemplary embodiments of the interface for the criterion selection process. In each of these figures, an If/Then selection process is utilized. In this embodiment, the user selects from certain criteria on the "If" 640 side of the selection screen 600 and decides whether or not he wants notification of an occurrence. The user also selects criteria from the "Then" 642 side of the selection screen 600 and decides whether or not he wants a confirmation of any transactions. If the "If" 640 criteria are satisfied, the system will process the "Then" 642 transaction that has been selected. Users are encouraged to make as many If/Then criterion selections as necessary for an asset.

FIG. 6A shows an example of an exemplary embodiment of the selection screen. In this embodiment, the user has chosen that he wants his assets moved if the total asset size of a certain money market fund falls below $1 billion within the last day. The user has selected to receive notice if this event occurs. In the event of this occurrence, the user has selected to transfer the total fund to another fund that has had the highest net performance in the last 30 days. The user has also selected that this new fund must have an asset size of at least $1 billion and that the user wishes to be sent a confirmation of the transaction.

FIG. 6B shows another example of an exemplary embodiment of the selection screen. In this embodiment, the user has chosen that he wants his assets moved if the gross fund performance of a certain mutual fund falls below 5.25% within the last 30 days. The user has selected to receive notice if this event occurs. In the event of this occurrence, the user has selected to transfer the total fund to another fund that has had the highest gross performance in the last 30 days. The user has not selected any further parameters for this fund but the user wishes to be sent a confirmation of the transaction.

FIG. 6C shows an example of an exemplary embodiment of the selection screen. In this embodiment, the user has chosen that he wants his assets moved if the S&P Rating of a certain money market fund falls below "AAA" or "Aaa" within the last day. The user has selected to receive notice if this event occurs. In the event of this occurrence, the user has selected to transfer the total fund to another fund that has had the highest S&P Rating as of the last 20 days. The user has also selected that this new fund must have an asset size of at least $1 billion and that the user wishes to be sent a confirmation of the transaction.

FIG. 6D shows a further example of an exemplary embodiment of the selection screen. In this embodiment, the user has chosen that he wants his assets moved if the net fund performance of a certain mutual fund falls below 5% within the last 15 days. The user has selected to receive (email) notification if this event occurs. In the event of this occurrence, the user has selected to transfer the total fund to another fund that has had the highest net fund performance in the last 60 days. The user has also selected that this new fund must have an S&P Rating of at least AAA and that the user wishes to be sent a confirmation of the transaction.

Users are also encouraged to make many criterion selections for multiple assets and funds. For example, a fund manager may wish to take a vacation or need to leave the office for an extended period of time. This invention would allow the fund manager to set his parameters and automatically manage his funds from any place outside the office.

Figure 7:
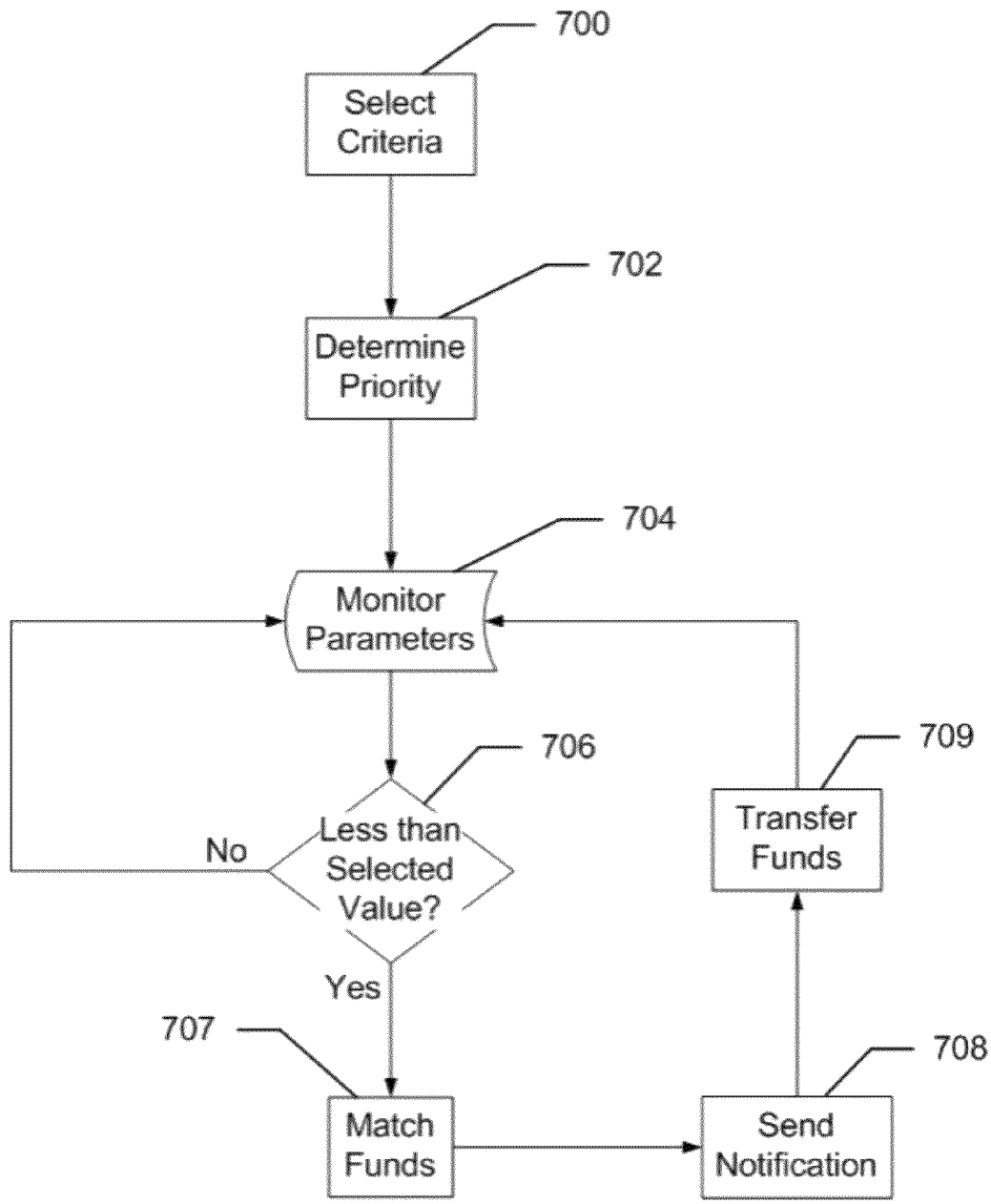
FIG. 7 shows a process of the application interface according to an exemplary embodiment of the present invention.

FIG. 7 shows an exemplary embodiment of the process of the application interface. The user first selects 700 the parameters and parameter limits of the fund to be monitored. Next, the user determines priority levels 702 of the parameters. This allows the user to determine the order in which the process will step through the parameters. If the highest level parameter is met, it may not be necessary for the process to go to the next parameter. However, if the highest level parameter is not met, the process may automatically start a transaction or it may look to the next parameter. With the priority levels 702 set, the application interface monitors 704 the fund parameters selected by the user. The process will then evaluate the parameter values 700 selected by the user. If a parameter falls below the limit of the user selected value, then the application interface selects 707 other funds where the selected parameter is greater than or equal to the selected value. The application interface matches selected funds 707 from the list of other funds that have the highest level of the next highest priority parameter 702 entered. With the funds matched, the application interface sends notification 708 to the user that a fund change is going to be made and allows the user to change parameter values and priority level. The system automatically transfers funds 709 from the original fund to the fund which matched the criteria. If no fund meets all the criteria, then the fund that meets the highest prioritized criteria possible is selected. The process then repeats, beginning with monitoring the new fund. This process can essentially act as an endless loop without need for further intervention by a user. In other words, the process serves to maximize its funds according to the pre-selected parameters set at 702. At any time the user may change the parameters 700 and priority level 702.

As a non-limiting example, if a client was invested in a WACHOVIA MONEY MARKET FUND and had previously entered the criteria that any such fund he is invested in must have a portfolio size of at least $1 billion USD and the WACHOVIA MONEY MARKET FUND's assets subsequently dropped below this predetermined $1 billion level, his assets would automatically be transferred to another fund on the platform that had at least $1 billion in assets.

In another exemplary embodiment of the invention, more than one criterion may be entered in a particular sequence. The sets of criteria may be layered to establish the order in which the user prefers them to be carried out. For example, if the assets in the fund the user is currently investing in should drop below $1 billion the invention could automatically move the assets from the user's account into the highest yielding fund which also has assets of at least $1 billion. This requires the determination of when the fund has dropped below the $1 billion threshold and well as determining the highest yielding fund that does meet the threshold requirement. The determination of the highest yielding fund could be based upon the previous days close or some other metric.

In a further embodiment, once the criteria for selecting funds is established, it will remain uncharged until the account holder takes action to charge or remove their predetermined criteria.

Figure 8A:
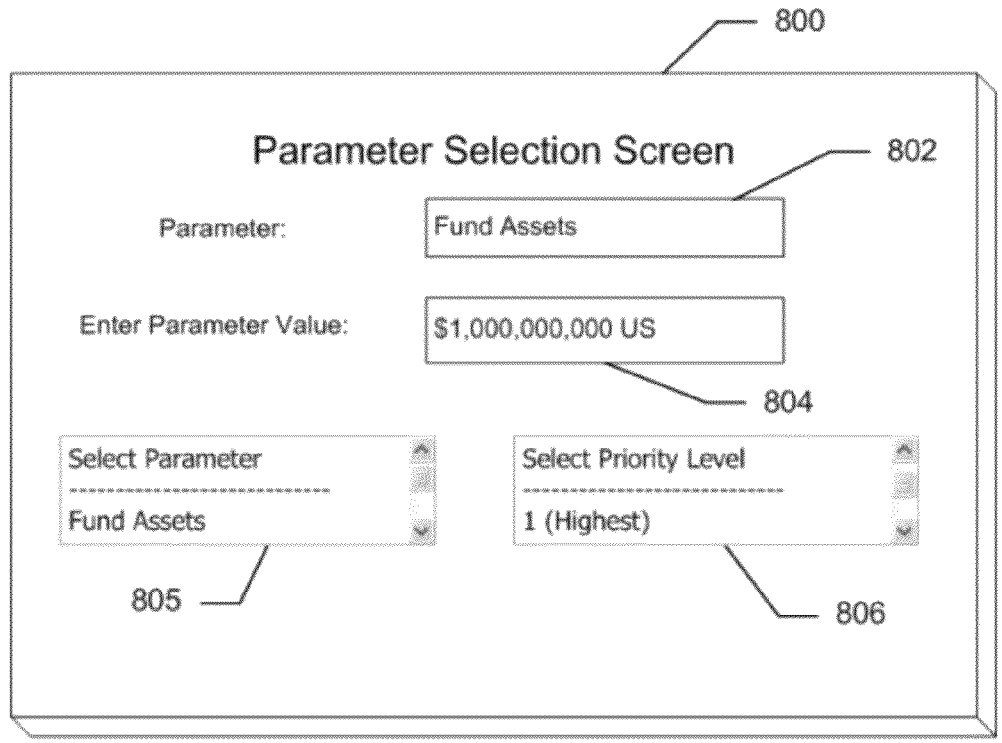
FIG. 8A shows an example of a user interface according to an exemplary embodiment of the present invention.

FIG. 8A shows an exemplary embodiment of a graphical user interface according to the present invention. In this embodiment, the user is given a parameter selection screen with which he inputs the parameters for his investment. The user chooses a parameter which he would like his investments based upon. He next can enter a value for this parameter. Additionally, the user can enter the priority of this parameter. Thus, if the user enters more than one parameter, he may dictate the order in which these parameters will be carried out. In the figure, the parameter the user has selected is fund assets. The user has entered a value of $1 billion for the fund assets. Thus, the user has set the threshold level of $1 billion for the fund assets value. This means that the investments will automatically be made based on reaching or falling below this threshold. The user has selected this to be the highest priority. As the highest priority, the fund asset parameter will take precedent over other selected parameters.

Figure 8B:
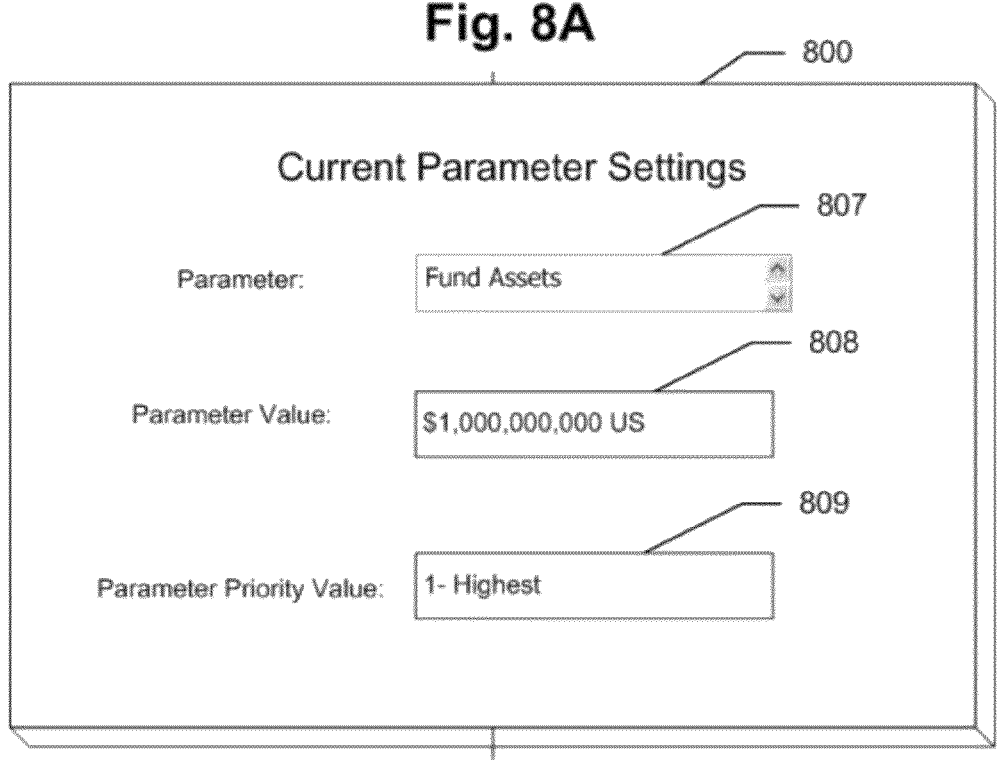
FIG. 8B shows an example of a user interface according to an exemplary embodiment of the present invention.

FIG. 8B shows an exemplary embodiment of an example of the graphical user interface. In this example, the graphical user interface is showing the current parameter settings that the user has set. This interface shows the parameter selected, the parameter value, and the parameter priority value. The user can change the parameter selected and the interface will show the parameter value the user has set as well as the priority of that parameter the user has set.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for automatically transferring an asset from a first fund to a second fund, the system comprising:
   an asset invested in a first collective investment fund;
   a collective investment fund database having information about a plurality of available collective investment funds and used in determining which of the plurality of collective investment funds meet a prioritized user predetermined criteria, the plurality of available collective investment funds including the first collective investment fund;
   wherein the information in the collective investment fund database comprises, for each collective investment fund, an asset size of the collective investment fund, a gross performance of the collective investment fund, and a net collective investment fund performance;
   wherein the prioritized user predetermined criteria is stored on a computer, which is connected to the collective investment fund database, and includes a condition specific to the first collective investment fund that triggers a transfer of the asset;
   wherein the computer automatically and without any user intervention:
      monitors the first collective investment fund until the first collective investment fund does not meet the prioritized user predetermined criteria,
      evaluates the plurality of available collective investment funds,
      selects, from the plurality of available collective investment funds, the second collective investment fund, the second collective investment fund best matching the prioritized user predetermined criteria, and
      transfers the asset from the first collective investment fund to the second collective investment fund.

2. The system in claim 1, wherein the information in the collective investment fund database further comprises a one day, seven day, thirty day, six month, twelve month, three year, five year, and ten year average.

3. The system in claim 1, wherein criteria for the condition comprises a plurality of If/Then commands based on any of the information in the collective investment fund database.

4. The system in claim 1, wherein the computer is a personal computer.

5. The system in claim 1, wherein the condition that triggers a transfer comprises the first collective investment fund falling outside the prioritized user predetermined criteria, and the second collective investment fund within the prioritized user predetermined criteria.

6. The system in claim 1, wherein the computer sends a user a confirmation upon a transfer of the asset.

7. A system for automatically transferring an asset from a first fund to a second fund, the system comprising:
   a pre-selected collective investment fund containing an asset;
   a user predetermined criteria, prioritized by the user to determine which of a plurality of collective investment funds is suitable for the asset;
   a plurality of collective investment fund data which is continuously updated depending on market conditions and used to determine which of the plurality of collective investment funds meets the user predetermined criteria, the plurality of available collective investment funds including the pre-selected collective investment fund;
   wherein the plurality of collective investment fund data comprises, for each collective investment fund, an asset size of the collective investment fund, a gross performance of the collective investment fund, and a net collective investment fund performance;
   a computer which
      continuously monitors the pre-selected collective investment fund until the pre-selected collective investment fund does not comply with the user predetermined criteria for the asset,
      evaluates the plurality of available collective investment funds,
      selects, from a plurality of available collective investment funds, a second collective investment fund, the second collective investment fund best matching the user predetermined criteria;
   wherein without any user intervention an automatic transfer of the asset is made from the pre-selected collective investment fund to the second collective investment fund in the event the pre-selected collective investment fund fails to meet the user predetermined criteria.

8. The system in claim 7, wherein the plurality of collective investment fund data further comprises a one day, seven day, thirty day, six month, twelve month, three year, five year, and ten year average.

9. The system in claim 7, wherein the user predetermined criteria comprises a plurality of conditions prioritized by the user, based on any of the fund data.

10. The system in claim 7, wherein the automatic transfer is triggered by the pre-selected collective investment fund falling outside the user predetermined criteria while the second collective investment fund falls within the user predetermined criteria.

11. A method for automatically transferring a first asset from a first collective investment fund to another, the method comprising:

monitoring on a computer the first collective investment fund until the first collective investment fund does not meet a user predetermined criteria programmed on a computer including a condition specific to the first collective investment fund that triggers a transfer of the asset;

evaluating by the computer a plurality of available collective investment funds, the plurality of available collective investment funds including the first collective investment fund;

wherein the plurality of collective investment fund comprises data for each collective investment fund, used in determining which of the plurality of collective investment funds meet the user predetermined criteria, which includes an asset size of the collective investment fund, a gross performance of the collective investment fund, and a net collective investment fund performance;

selecting, from a plurality of available collective investment funds, a second collective investment fund, the second collective investment fund best matching the user predetermined criteria; and automatically transferring the asset from the first collective investment fund to the second collective investment fund via the computer without any user intervention.

12. The method in claim 11, wherein the programming further comprises determining priority of the user predetermined criteria.

13. The method in claim 11, wherein the second collective investment fund is selected when the first collective investment fund fails to meet the user predetermined criteria.

14. The method in claim 11, wherein the second collective investment fund meets the highest prioritized criteria possible when no collective investment fund meets all the user predetermined criteria.

15. The method in claim 11, further comprising sending notification of a transfer to the user.

* * * * *